Aug. 2, 1960 W. H. ELLIOT 2,947,881

TIME DELAY SYSTEMS UTILIZING TRANSISTORS

Filed March 7, 1957 2 Sheets-Sheet 1

Inventor
William H. Elliot
By H R Rather
Attorney

Aug. 2, 1960 W. H. ELLIOT 2,947,881

TIME DELAY SYSTEMS UTILIZING TRANSISTORS

Filed March 7, 1957

2 Sheets-Sheet 2

Inventor
William H. Elliot
By H R Rather
Attorney

United States Patent Office 2,947,881
Patented Aug. 2, 1960

2,947,881

TIME DELAY SYSTEMS UTILIZING TRANSISTORS

William H. Elliot, Whitefish Bay, Wis., assignor to Cutler-Hammer, Inc., Milwaukee, Wis., a corporation of Delaware Filed Mar. 7, 1957, Ser. No. 644,506

8 Claims. (Cl. 307—88.5)

This invention relates to time delay systems utilizing transistors.

It is a primary object of the present invention to provide improved time delay systems incorporating transistors and capacitor timing circuits of novel form.

Another object is to provide systems of the aforementioned character which are suitable for effecting time delay control of translating devices or affording timed reference voltages.

A further object is to provide systems of the aforementioned character which are characterized by affording longer periods of time delay than would be indicated by the time constants of components of the delay circuit.

A still further object is to provide certain forms of the aforementioned systems which are characterized by having rapid reset.

Other objects and advantages of the invention will hereinafter appear.

The accompanying drawings illustrate preferred embodiments of the invention which will now be described in detail, it being understood that the embodiments illustrated are susceptible of modifications in respect of detail without departing from the scope of the appended claims.

Referring to the drawing.

Figure 1:
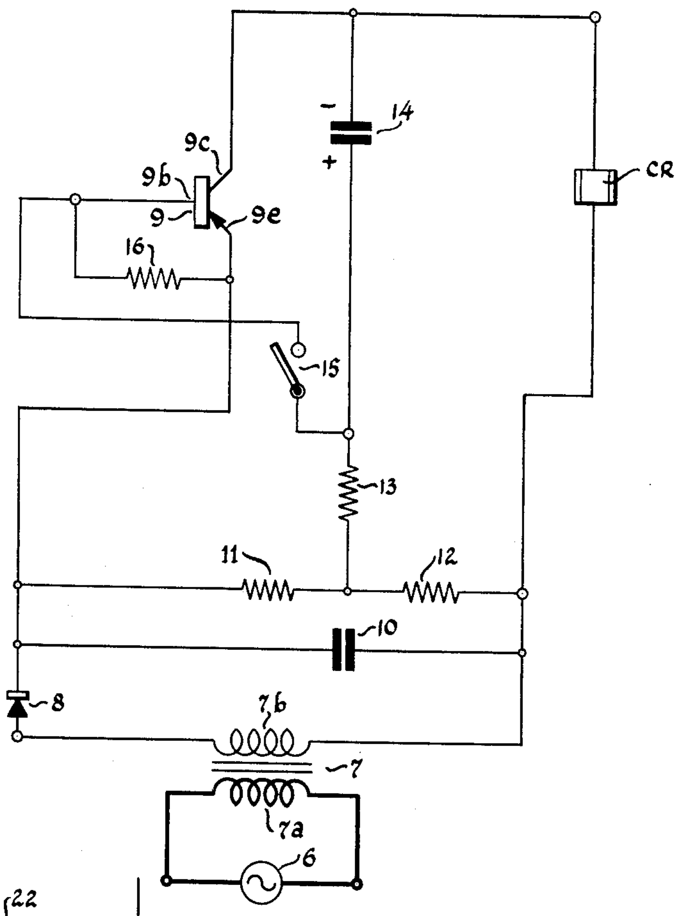
Figure 1 is a diagrammatic showing of a time delay control system incorporating the invention.

Referring to Fig. 1, there is shown an alternating current supply source 6 across which is connected end terminals of a primary winding 7*a* of a transformer 7. Transformer 7 has a secondary winding 7*b* and the latter winding is connected at one end terminal in series with a half-wave rectifier 8 to the emitter terminal 9*e* of a junction type transistor 9 which may be assumed to be of the P-N-P type. The collector terminal 9*c* of transistor 9 is connected in series with the control winding of an electromagnetic relay CR to the other end terminal of winding 7*b*. A smoothing capacitor 10 has one plate thereof connected to the point common between rectifier 8 and emitter terminal 9*e* of transistor 9 and has its other plate connected to the last mentioned end terminal of winding 7*b* of the transformer 7. A potential divider comprising resistors 11 and 12 is connected in parallel with the capacitor 10. A resistor 13 is connected at one end to the point common between resistors 11 and 12 and is connected at its other end in series with a capacitor 14 to the point common between collector electrode 9*c* of transistor 9 and one end of the control winding of relay CR. The point common between resistor 13 and capacitor 14 is connectable through a switch 15 to the base terminal 9*b* of transistor 9 upon closure of the switch 15. Emitter terminal 9*e* is connected to base 9*b* through a resistor 16.

Assuming that switch 15 is in the open position depicted in the drawing, whenever source 6 is active to energize primary winding 7*a* of transformer 7, charging current flows on alternate half cycles from the left-hand terminal of secondary winding 7*b* through resistors 11 and 13, capacitor 14, the control coil of relay CR to the right-hand end terminal of winding 7*b*. Capacitor 14 will charge to a potential which is substantially equal to the potential across resistor 12. Base terminal 9*b* by virtue of its connection to emitter 9*e* through resistor 16 will be at the same potential as emitter 9*e* and consequently, transistor 9 will be biased substantially to cut-off so that only a small leakage current flows through its emitter-collector circuit.

Upon closure of switch 15, base terminal 9*b* will be subjected to the potential of the positive plate of capacitor 14. Consequently, base terminal 9*b* will be biased negatively with respect to emitter 9*e* sufficiently to cause a certain amount of emitter-base current flow. Such emitter-base current will be sufficient to suddenly initiate a proportionate amount of emitter-collector current flow through the control winding of relay CR. Capacitor 14 immediately commences to discharge through the path comprising resistors 13, 11 and the emitter-collector circuit of transistor 9. At the instant such discharge commences, the potential of the upper end of resistor 13, which is common to capacitor 14 and base terminal 9*b* of transistor 9, is raised above its normal potential due to discharge current flow through the resistors. Thus initially the potential difference between base terminal 9*b* and emitter terminal 9*e* will be somewhat less than that of the potential drop across resistor 11. Accordingly, the emitter-base current flow will be initially limited and the emitter-collector current flow through the control winding of relay CR will be correspondingly limited. As capacitor 14 continues to discharge the potential of the upper end of resistor 13 decreases and ultimately approaches the potential existing at the junction between resistors 11 and 12, the former potential being slightly higher due to the normal emitter-base current flow through resistor 13. Ultimately the value of emitter-collector current flow through the control winding of relay CR rises to fully energize the same.

The time delay afforded by the aforedescribed circuit is greater than that which would be dictated by the constants of the capacitor discharge circuit as capacitor 14 does not discharge exponentially. As capacitor 14 discharges the emitter-collector current flow through transistor 9 increases, and hence the IR drop across the control winding of relay CR increases, thereby causing the potential of the negative plate of capacitor 14 to become more positive, thus pushing the charged capacitor 14 more positive to limit the rate of increase of emitter-base current flow, and hence the rate of emitter-collector current flow. This action is comparable to "negative feedback" or "degenerative action" and whereas for given circuit constants one second time delay might be expected, delay on the order of five or six seconds may be realized.

Figures 2, 3, 5:
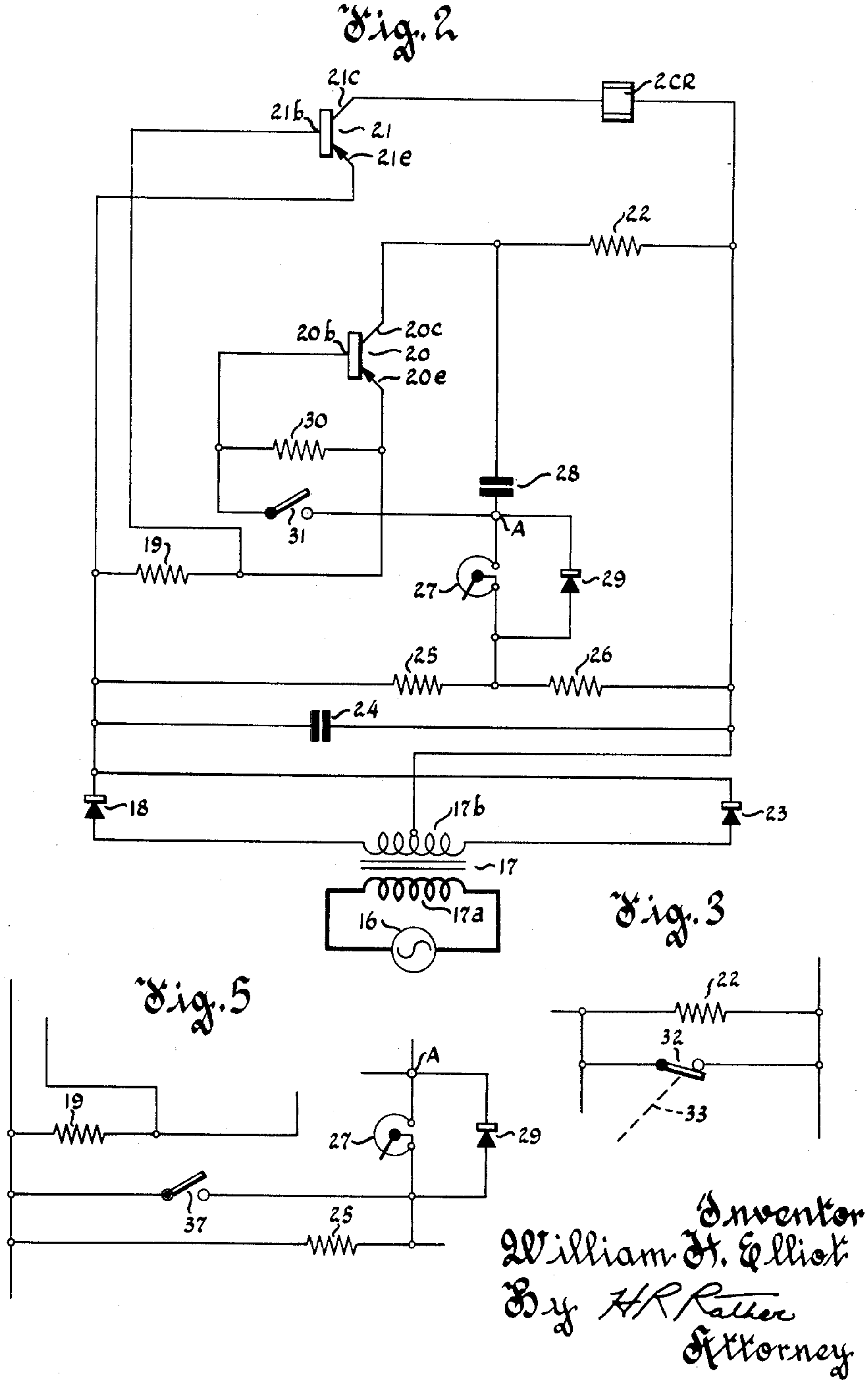
Fig. 2 depicts another time delay control system incorporating a modification of the invention shown in Fig. 1.
Fig. 3 is a fragmentary view disclosing a modification of the system of Fig. 2.
Fig. 5 is a fragmentary view showing a third possible modification of the system of Fig. 2.

Fig. 2 shows a two-stage transistor timing circuit which employs a first-stage similar to that aforedescribed in connection with the system of Fig. 1. However, in this modified form the first-stage transistor is very lightly loaded to minimize heating thereof so that the timing afforded by the circuit will not be adversely affected by temperature rise of the transistor. A control device such as the control winding of a relay is connected in circuit with a second transistor in the second stage for operation at a higher power level.

More particularly, the system in Fig. 2 shows an alternating current supply source 16 to which is connected the primary winding 17a of a transformer 17. Transformer 17 has a center tapped secondary winding 17b, and the left-hand end terminal of winding 17b is connected in series with a half-wave rectifier 18 and a resistor 19 to the emitter terminal 20e of a junction type transistor 20 and such terminal is also connected in series with rectifier 18 to the emitter terminal 21e of a second junction type transistor 21. The collector terminal 20c of transistor 20 is connected in series with a resistor 22 to the center tap terminal of winding 17b. The collector terminal 21c of transistor 21 is connected in series with the control winding of a relay 2CR to the center tap terminal. The right-hand end terminal of winding 17b is connected in series with a half-wave rectifier 23 to the load side of rectifier 18 to afford, in conjunction with rectifier 18 and center tapped winding 17b, a well-known form of full-wave rectified alternating current supply. A filter capacitor 24 is connected between the load side terminal of rectifier 18 and the center tap terminal of winding 17b to provide smoothing of the rectified wave form. A voltage divider comprising resistors 25 and 26 is connected in parallel with the capacitor 24. The junction between resistors 25 and 26 is connected in series with the resistor element of an adjustable resistor 27 and a capacitor 28 to the point common between collector terminal 20c of transistor 20 and resistor 22. A half-wave rectifier 29 is connected in parallel with the resistance element of an adjustable resistor 27. Transistor 20 has a base terminal 20b which is connected through a resistor 30 to emitter terminal 20e and is also connectable upon closure of a switch 31 to the point common between capacitor 28 in the resistance element of adjustable resistor 27. Transistor 21 has a base terminal 21b which is connected to the point common between resistor 19, resistor 30 and emitter terminal 20e of transistor 20.

Assuming that source 16 is active to supply alternating current to primary winding 17a and that switch 31 is open, charging current flows through resistor 25, a half-wave rectifier 29, capacitor 28 and resistor 22 to charge capacitor 28 to substantially the potential existing across resistor 26. As base terminal 20b will be at the same potential as emitter terminal 20e, transistor 20 will be biased to cut-off. Thus as the IR drop across resistor 19 will be substantially zero the potential of base 21b will be substantially the same as the potential of emitter terminal 21e of transistor 21, and that latter will be biased to cut-off and the control winding of relay 2CR will be unenergized. When switch 31 is closed, base terminal 20b will be biased negatively with respect to emitter terminal 20e in transistor 20 to thereby initiate emitter-base current flow, and hence emitter-collector flow through transistor 20 and resistor 22. Capacitor 28 will discharge through the resistance element of adjustable resistor 27, resistors 25 and 19 and the emitter-collector circuit of transistor 20. The manner of discharge and timing afforded will be essentially as that aforedescribed in Fig. 1. When the emitter-collector current flows through transistor 21 there will be IR drop across resistor 19 such as to bias base terminal 21b negative with respect to emitter terminal 21e and thereby effect emitter-collector current flow through transistor 21 and the control winding of 2CR. Ultimately emitter-collector current flow will rise sufficiently to fully energize the control winding of relay 2CR. Upon reopening of switch 31 transistor 20 will be immediately biased to cut-off and the IR drop across resistor 19 will accordingly be reduced to zero thereby biasing transistor 21 to cut-off to afford deenergization of the control winding of relay 2CR.

The use of the half-wave rectifier 29 reduces the time of system reset as charging current flow is by-passed around adjustable resistor 27 which in some cases may have a resistance value of 5,000 to 10,000 ohms. Adjustable resistor 27 permits adjustment of the time delay discharge within limits.

If resistor 22 has appreciable ohmic resistance, which it is likely to have if the loading of transistor 20 is to be kept low, it will adversely effect the rate of reset of the system upon opening of switch 31. A modification shown in Fig. 3, wherein a switch 32 is connected in parallel with resistor 22 and mechanically coupled to switch 31 as through the connection depicted by 33, provides for more rapid reset. In this modification it may be assumed that whenever switch 31 is open switch 33 will be closed and vice versa. Thus when switch 31 is open, resistor 22 will be effectively shunted out of circuit and no appreciable resistance will exist in the charging circuit for capacitor 28.

Figure 4:
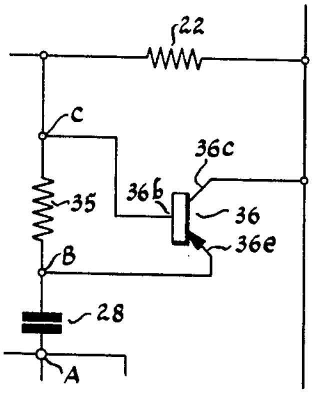
Fig. 4 is a fragmentary view showing another modification of the system of Fig. 2.

In some instances complications of mechanical switching and inter connections of the modifications of Fig. 3 may be undesirable, and Fig. 4 shows another modification for also achieving relatively rapid reset. In the modification of Fig. 4 a resistor 35 is interposed in the connection between capacitor 28 and the point common between collector terminal 20c of transistor 20 and resistor 22. A transistor 36 has its emitter 36e connected to the lower terminal B of resistor 35, its base terminal 36b connected to the upper terminal C of resistor 35, and its collector terminal 36c connected to the point common between the right-hand end of resistors 22 and 26. When switch 31 is open and capacitor 28 is fully charged, no appreciable current flows through resistor 35 and thus base terminal 36b and emitter terminal 36e are at the same potential, thereby affording cut-off of the emitter-collector circuit of transistor 36. However, assuming that when capacitor 28 is completely discharged following a time delay interval switch 31 is opened, the charging current flowing through capacitor 28 will cause a voltage drop across resistor 35, and as terminal C will be negative with respect to terminal B emitter-base current will flow and correspondingly emitter-collector current will flow through transistor 36 by-passing resistor 22. The emitter-collector circuit of transistor 36 is of relatively low impedance, thereby permitting capacitor 28 to receive most of its charge rapidly. It will be observed that the arrangement of transistor 36 with respect to resistor 35 is such as to cause transistor 36 to act like an automatic switch during charging of capacitor 28. When switch 31 is closed, providing discharge of capacitor 28 as aforedescribed in connection with Fig. 2, terminal C of resistor 35 will be positive with respect to terminal B; consequently, transistor 36 will be cut-off permitting normal functioning of the timing circuit.

As aforeindicated in connection with the description of the operation of the system of Fig. 2, at the moment of closure of switch 31 the potential of base terminal 20b of transistor 20 is abruptly changed to the potential of the positive plate of capacitor 28. Immediately a proportionate amount of emitter-collector current flows through resistor 22. For some applications it may be desired to avoid this initial abrupt step of emitter-collector current flow and the modification of the system of Fig. 2 shown in Fig. 5 may then be employed. This latter modification assumes that switch 31 is dispensed with and that base terminal 20b is permanently connected to the junction A. Further, as shown in Fig. 5, a switch 37 is connected in parallel with resistor 25. When switch 37 is closed base terminal 20b and emitter terminal 20e will be at the same potential as the positive plate of capacitor 28. Due to charging current flow through switch 37, capacitor 28 will, however, be charged to the full potential afforded by the supply source rather than to the value of the voltage drop across resistor 26. When switch 37 is opened base 20b will be at the initial full charge potential of the positive plate of capacitor 28 which is essentially the same as the potential of emitter terminal 20e. Thus at the moment of opening of switch 37 no emitter-base current will flow until capacitor 28 commences to discharge through adjustable resistor 27, resistor 25, resistor 19 and the emitter-collector circuit of transistor 20. Thus the emitter-collector current flow will initially be zero and increase uniformly in a stepless manner as capacitor 28 discharges. The use of the modification depicted in Fig. 5 may be useful where it is desired to obtain a timed reference voltage, such as that afforded across resistor 22 or the control winding of relay 2CR.

If a gradually decreasing current flow through resistor 22 or the control winding of relay 2CR be desired upon closure of switch 37, rectifier 29 may be omitted so that the charging current for the capacitor 28 will have to flow through adjustable resistor 27. The time constant of the circuit will be greater accordingly.

Whereas the controlled or impedance devices depicted in the systems of Figs. 1 and 2 and modifications thereof are shown as control windings of electromagnetic relays or a resistor, it is to be understood that other impedance devices, such as control windings for saturable reactors and magnetic amplifiers may be substituted therefor. The disclosed system in these cases provides a current flow through such control windings of a substantially linearly increasing and an exponentially decreasing nature. It will also be understood that the modification of the system of Fig. 2, aforedescribed in connection with Figs. 3 to 5, may also be employed in connection with the system of Fig. 1.

I claim:

1. In a timing system, a source of unidirectional potential, a transistor having an emitter, a collector and a base, an impedance connected in series with the emitter-collector circuit of said transistor across said source, a voltage divider connected across said source and having an intermediate potential terminal, a capacitor connected between said terminal and a point common between said collector and said impedance, and means including manual switch means for selectively connecting said base to and disconnecting it from the high potential plate of said capacitor.

2. The combination according to claim 1 wherein a resistor is interposed between said terminal and the aforementioned high potential plate of said capacitor.

3. The combination according to claim 2 wherein a unidirectional conducting device is connected in parallel with said resistor to afford by-pass of said resistor during capacitor charging current flow.

4. The combination according to claim 3 together with means for shunting said impedance out of circuit during charging of said capacitor.

5. The combination according to claim 4 wherein the last mentioned means comprises a switch connected in parallel with said impedance.

6. The combination according to claim 4 wherein the last mentioned means comprises a resistor connected between said capacitor and said impedance, and a transistor having its emitter-base circuit connected across said resistor and its collector-base circuit connected across said impedance.

7. The combination according to claim 3 together with means for selectively shunting the high potential portion of said voltage divider during charging of said capacitor.

8. In combination, a source of unidirectional potential, a pair of impedance devices, a transistor having an emitter, collector and base and having its emitter-collector circuit connected in series with said impedance devices across said source, a third impedance device, a second transistor having its emitter-collector circuit connected in series with said third impedance device across said source and having its base connected to a point common between one of said pair of impedance devices and the emitter of the first mentioned transistor, a voltage divider connected across said source and having an intermediate potential terminal, a capacitor having its high potential plate connected between said intermediate potential terminal of said voltage divider and having its other plate connected to point common to the collector of the first mentioned transistor and the other of said pair of impedance devices, and means including manual switch means for selectively biasing the base electrode of said first mentioned transistor negatively with respect to its emitter.

References Cited in the file of this patent

UNITED STATES PATENTS

| | | |
|---|---|---|
| 2,448,069 | Ames et al. | Aug. 31, 1948 |
| 2,641,701 | Moore | June 9, 1953 |
| 2,777,057 | Pankove | Jan. 8, 1957 |
| 2,827,574 | Schneider | Mar. 18, 1958 |
| 2,831,113 | Weller | Apr. 15, 1958 |
| 2,845,583 | Reuther et al. | July 29, 1958 |